(12) United States Patent
Tuan et al.

(10) Patent No.: US 8,847,889 B2
(45) Date of Patent: Sep. 30, 2014

(54) MOUSE PEN AND PHOTOELECTRIC CONTROL SWITCH THEREOF

(75) Inventors: Hsi-Ching Tuan, Shenzhen (CN); Chao-Yang Tuan, Shenzhen (CN)

(73) Assignee: Shenzhen Yibao Technology Co., Ltd., Guangdong Province (CN)

( * ) Notice: Subject to any disclaimer, the term of this patent is extended or adjusted under 35 U.S.C. 154(b) by 223 days.

(21) Appl. No.: 13/503,359

(22) PCT Filed: Oct. 19, 2010

(86) PCT No.: PCT/CN2010/077895
§ 371 (c)(1),
(2), (4) Date: Apr. 20, 2012

(87) PCT Pub. No.: WO2011/047618
PCT Pub. Date: Apr. 28, 2011

(65) Prior Publication Data
US 2012/0206360 A1    Aug. 16, 2012

(30) Foreign Application Priority Data

Oct. 20, 2009 (CN) .......................... 2009 2 0312817
Apr. 14, 2010 (CN) .......................... 2010 1 0146685
Aug. 2, 2010 (CN) .......................... 2010 2 0278567

(51) Int. Cl.
*G09G 5/08* (2006.01)
*G06F 3/0354* (2013.01)
(52) U.S. Cl.
CPC ........ *G06F 3/03542* (2013.01); *G06F 3/03545* (2013.01)
USPC ........................................................ 345/166

(58) Field of Classification Search
CPC ........................... G06K 7/10544; G06K 9/222
USPC ....................... 345/156–184; 178/19.01–19.07
See application file for complete search history.

(56) References Cited

U.S. PATENT DOCUMENTS

| | | | | |
|---|---|---|---|---|
| 4,672,154 A | * | 6/1987 | Rodgers et al. | ............ 178/19.07 |
| 5,029,968 A | * | 7/1991 | Geiser et al. | ..................... 385/51 |
| 5,652,412 A | * | 7/1997 | Lazzouni et al. | .......... 178/18.01 |
| 5,943,233 A | * | 8/1999 | Ebina et al. | ..................... 700/85 |
| 6,647,145 B1 | * | 11/2003 | Gay | ............................. 382/187 |

(Continued)

FOREIGN PATENT DOCUMENTS

| CN | 2821686 Y | 9/2006 |
|---|---|---|
| CN | 2821689 Y | 9/2006 |

(Continued)

*Primary Examiner* — Sumati Lefkowitz
*Assistant Examiner* — Peijie Shen

(57) ABSTRACT

A mouse pen and a photoelectric control switch thereof are provided, the photoelectric control switch includes a control rod in a shell moving between on-position and off-position, an optical coupling sensor comprising a light emitter and light receiver disposed on an extension line of the control rod, and an elastic element for resetting the control rod. The control rod includes a first end near the optical coupling sensor and equipped with a reflection element, and a second end for driving the control rod towards the optical coupling sensor which protrudes an orifice of the shell; at the on-position, light emitting from the light emitter is received by the light receiver after being reflected by the reflection element, while at the off-position, light cannot be received. The photoelectric control switch implements non-contact on/off controlling with the optical coupling sensor and the control rod, responses sensitively, and has longer lifetime.

15 Claims, 6 Drawing Sheets

(56) References Cited

U.S. PATENT DOCUMENTS

| | | | |
|---|---|---|---|
| 7,072,533 B1* | 7/2006 | Krier | 385/13 |
| 7,492,285 B2* | 2/2009 | Chiang et al. | 341/20 |
| 2001/0025289 A1* | 9/2001 | Jenkins et al. | 708/141 |
| 2003/0141119 A1* | 7/2003 | Chao et al. | 178/19.01 |
| 2005/0035947 A1* | 2/2005 | Lutian | 345/166 |
| 2005/0057492 A1* | 3/2005 | Bathiche et al. | 345/156 |
| 2005/0106943 A1* | 5/2005 | Lee | 439/630 |
| 2005/0190157 A1* | 9/2005 | Oliver et al. | 345/166 |
| 2006/0028456 A1* | 2/2006 | Kang | 345/179 |
| 2007/0014490 A1* | 1/2007 | Silverbrook et al. | 382/313 |
| 2007/0088878 A1* | 4/2007 | Wang | 710/74 |
| 2008/0001078 A1* | 1/2008 | Pittel et al. | 250/252.1 |
| 2008/0225007 A1* | 9/2008 | Nakadaira et al. | 345/173 |
| 2010/0021022 A1* | 1/2010 | Pittel et al. | 382/123 |

FOREIGN PATENT DOCUMENTS

| | | |
|---|---|---|
| CN | 101154136 A | 4/2008 |
| CN | 100547528 C | 10/2009 |
| CN | 201522692 U | 7/2010 |
| CN | 101819477 A | 9/2010 |

* cited by examiner

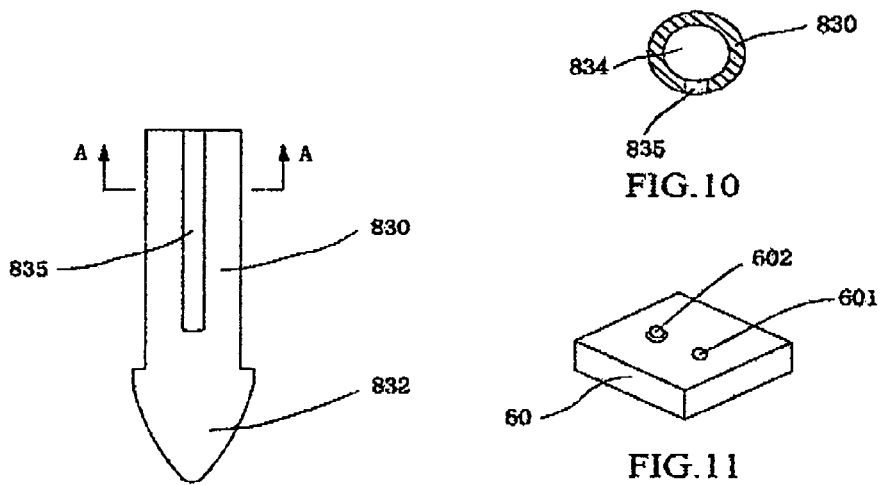
FIG. 9
FIG. 10
FIG. 11
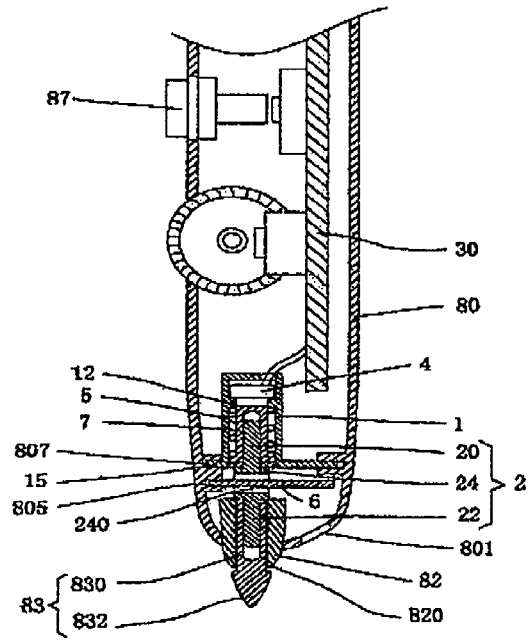
FIG. 12

MOUSE PEN AND PHOTOELECTRIC CONTROL SWITCH THEREOF

CROSS REFERENCE TO RELATED APPLICATIONS

The present application is a 35 U.S.C. §371 National Phase conversion of International (PCT) Patent Application No. PCT/CN2010/077895, filed on Oct. 19, 2010, the disclosure of which is incorporated by reference herein. The PCT International Patent Application was published in Chinese.

FIELD OF THE INVENTION

The present invention relates to a computer auxiliary input device, especially to a mouse pen and photoelectric control switch thereof

BACKGROUND OF THE INVENTION

In the existing mouse device such as mouse pen and traditional mouse, left button, right button, middle button and all control switch are mechanical control switch, such as microswitch or thin-film switch. Such mechanical control switch is contact-type, time difference certainly exists between switch-on and switch-off, thus it cannot respond rapidly and in time; and the contact part thereof for switch-on will generate fatigue deformation and wear, the sensitivity thereof will be gradually degraded, and thus the useful life period thereof will be limited. Generally, the actual life period of the mechanical control switch just can be clicked by tens of or at most millions of times, often it is the shortest-lifetime component among all components of the mouse device, and consequently increases the use-cost of user's.

The existing mouse pen is equipped with an LED light and an image receiver in a bottom end of the penholder thereof LED light emits light to irradiate a plane where mouse pen sliding, and images formed thereon are in turn received by the image receiver to chase movement traces of the mouse pen, and then the cursor movement displayed on a monitor of a computer is controlled. Because the mouse pen needs respectively set LED light and image receiver, assembling is relatively miscellaneous, outer diameter of the penholder bottom is difficultly reduced, and the big penholder reduces grasping comfort. Additionally, the penpoint of the existing mouse pen is usually inserted into a pen head and then keeps close to a photoelectric switch in the penholder. When the penpoint is pressed, it moves upwards to keep the photoelectric switch turn on. The penpoint bears a spring, so as to afford a resilience force when the mouse pen is taken up. However, for such installation structure of the existing penpoint, when desired to replace the penpoint, it is necessary to detach the penpoint together with the pen head, and to reassemble pen head back after the penpoint is replaced, and operations are miscellaneous.

Furthermore, the penpoint of existing mouse pen is specially designed and manufactured, when the penpoint is damaged, the user cannot replace it himself, and yet cannot choose to replace it according to his desire.

SUMMARY OF THE INVENTION

A technical problem to be solved in the present invention is to provide a photoelectric control switch, so as to effectively improve useful life period of the photoelectric control switch.

Another technical problem to be solved in the present invention is to provide a mouse pen, which has a longer useful life period than traditional mouse device with mechanical control switch.

One more technical problem to be solved in the present invention is to provide a mouse pen, which can reduce outer diameter of a bottom end of a penholder so as to improve grasping comfort.

A further technical problem to be solved in the present invention is to provide a mouse pen, which can facilitate replacing penpoint.

To solve the above technical problem, the present invention discloses such technical proposal that: a photoelectric control switch, being set to an mouse device, comprises a control rod which is disposed in a shell and can traverse between an on-position and an off-position, an optical coupling sensor which is disposed on an extension line of one end of the control rod and electrically connected with a control circuit board of the mouse pen, and an elastic element which is used for resetting the control rod; the control rod comprises a first end which is close to the optical coupling sensor and is equipped with a reflection element and a second end which is far away from the optical coupling sensor and is used for driving the control rod to be close to the optical coupling sensor; the shell defines an orifice for protruding the second end; the optical coupling sensor comprises a light emitter and a light receiver, when the control rod is set on the on-position, light emitting from the light emitter can be received by the light receiver after being reflected by the reflection element, while the control rod is set on the off-position, the light receiver can not receive the light emitting from the light emitter and reflected by the reflection element.

Further, the reflection element is a reflection layer which is directly disposed on an outer surface of the first end of the control rod, the shell configures a first limit block corresponding to the first end of the control rod, and configures a second limit block corresponding to the second end of the control rod, the control rod at middle section thereof forms a stop part which is engaged with the second limit block so as to limit a movement of the control rod, and the elastic element is fitted on the control rod with both ends thereof respectively abutting against the stop part and the first limit block.

Further, the reflection element is a reflection cap being worn on the first end of the control rod; the reflection cap comprises a cap top, cap edge, and cap body connected between the cap top and the cap edge; an outer surface of the cap top is equipped with a reflection layer; a first limit block fixed relative to the shell is disposed between the optical coupling sensor and the cap edge; the elastic element is fitted on the cap body with both ends thereof respectively abutting against the first limit block and the cap edge; the shell configures a second limit block corresponding to the second end; and the control rod at middle section thereof is equipped with a stop part which is engaged with the second limit block so as to limit a movement of the control rod.

Further, the elastic element is a coil spring, or elastic rubber, or elastic sheet; the elastic element has one end fixed relative to the control rod and the other end fixed relative to the shell.

On the other hand, the present invention also provides a mouse pen, which comprises a penholder, a penpoint inserted in an bottom end of the penholder, control circuit component disposed in the penholder, and optical component; the control circuit component comprising a control circuit board disposed in the penholder, a photoelectric control switch connected with the control circuit board and engaged with a top end of the penpoint so as to generate mouse control signals, button set and a power switch which are disposed at side wall of the penholder; is characterized in that: the photoelectric control switch is the photoelectric control switch according to any one of the preceding claims 1~4.

Further, the optical component comprises a transmit-receive integrative chip, the transmit-receive integrative chip has sealed therein with a laser-generating chip and an image receiver, the bottom end of the penholder defines a light hole, the laser-generating chip and image receiver are all set towards the light hole, light emitting from the laser-generating chip passes the light hole and irradiates a tip of the penpoint, and images generated by the penpoint on a sliding plane are received by the image receiver.

Further, the penpoint is a ball pen core, or an ink pen core, or a plastic rod, or a metal rod.

Further, the mouse pen comprises at least one of the following components:
a cursor positioning switch being disposed on the penholder and connected with the control circuit board which is used for fixing a position of the cursor;
a battery disposed in the penholder and a USB port which is defined on the penholder, is connected with the control circuit board, and is used for charging the battery; or
a laser-pointer module, comprising a laser generator inside the penholder and a laser-pointer control button at one side of the penholder.

Further, a wireless transmitter is fitted in the penholder which is used to transmit control signals of the mouse pen to a corresponding computer in a wireless manner, the penholder at a top end thereof has a receptacle part, a wireless receiver is detachably disposed in the receptacle part for receiving signals transmitted from the wireless transmitter, the wireless receiver is connected with the receptacle part by a threaded fit or snap fit, and the wireless receiver is further equipped with a USB connector for being inserted to the computer and a memory chip which cooperates with the USB connector to form a U-disk memorizer.

Further, the mouse pen comprises a DPI-value setting module, which at least is set with a level of 200 DPI.

The advantages of the present invention are that: since the photoelectric control switch is constructed via the optical coupling sensor being engaged with the control rod which is equipped with a reflection layer, light emitting from the optical coupling sensor is reflected by the reflection layer, when the control rod is set on the on-position, light emitting from the light emitter of the optical coupling sensor is reflected by the reflection layer and then is received by the light receiver, while the control rod is set on the off-position, the light receiver of the optical coupling sensor can not receive the light emitting from the lighter emitter and being reflected by the reflection cap, thereby, the photoelectric control switch implements non-contact on/off controlling with an optical coupling sensor, and accordingly effectively prolongs a useful life period of the control switch; moreover, the optical coupling sensor responses to control operations rapidly and sensitively.

Via the transmit-receive integrative chip of which the laser-generating chip and the image receiver are integratedly arranged, the components to be assembled in the bottom of the penholder can be reduced, the penholder has a simpler structure, not only facilitates assembling, but further reduces the bottom size thereof so as to raise the grasping comfort.

Moreover, via using ball pen core or ink pen core in our usual work and life as the penpoint of mouse pen, users can conveniently replace the penpoint if desired, and can also use the mouse pen as general ball pen or ink pen; the penholder is equipped with the wireless transmitter therein, and is detachably equipped with the wireless receiver in top end thereof for conveniently taking with the wireless receiver; in use of the mouse pen, the wireless receiver is detached and inserted into the computer, so that the mouse pen can be conveniently used whenever and wherever; the laser-pointer module being set in the penholder enables the mouse pen used as a laser pointer, and thus expands the functions of mouse pen.

BRIEF DESCRIPTION OF THE DRAWINGS

FIG. 9 is a schematic view of a penpoint of the mouse pen of the present invention.

FIG. 10 is a cross-sectional view along plane A-A in FIG. 9.

FIG. 11 is a schematic view of a transmit-receive integrative chip used in the mouse pen of the present invention in accordance with the second embodiment.

FIG. 12 is a schematic view of a mouse pen of the present invention in accordance with a third embodiment.

DETAILED DESCRIPTION OF THE INVENTION

The present invention provides a photoelectric control switch used in a mouse device, which is set in a shell 1, used for traditional operation control such as left button, right button, middle button and the like and/or writing control for handwriting input.

Figure 1:
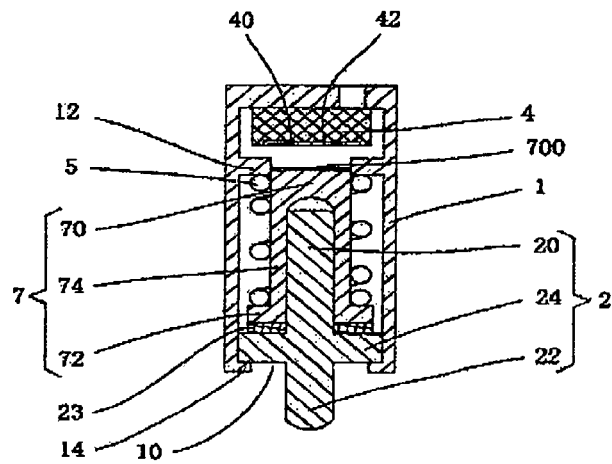
FIG. 1 is a schematic view of a photoelectric control switch of the present invention in accordance with a first embodiment.
Figure 4:
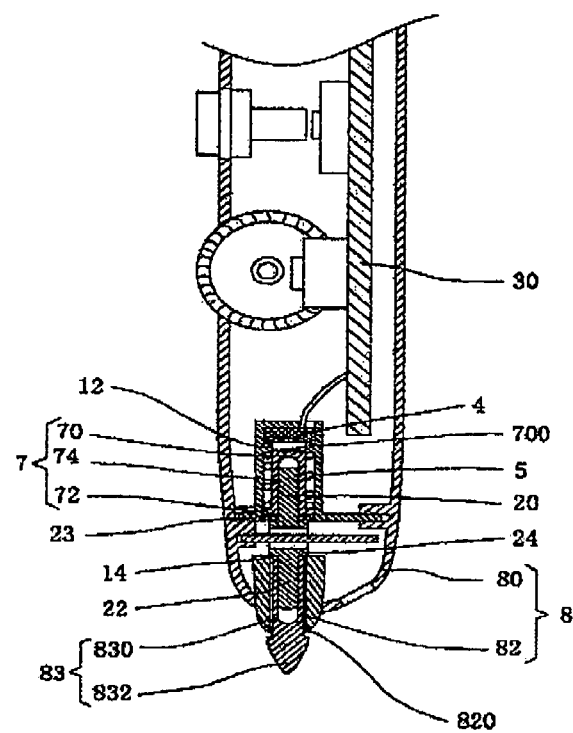
FIG. 4 is a schematic view of the photoelectric control switch of the present invention in accordance with a first application embodiment.
Figure 5:
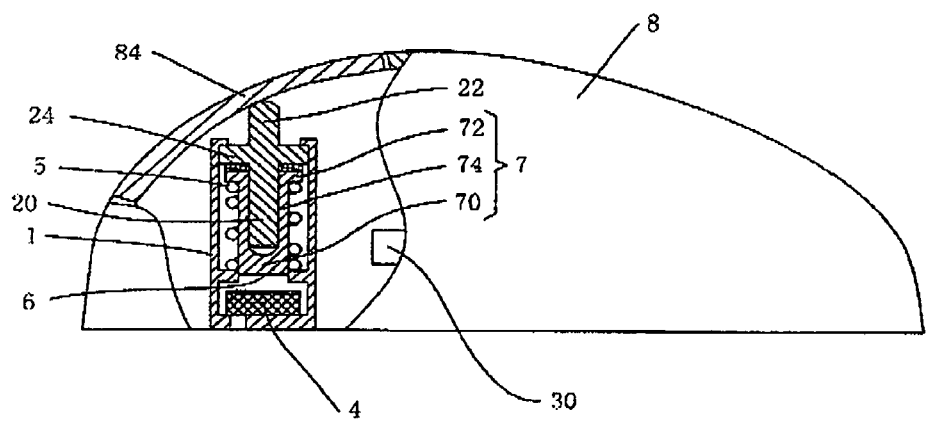
FIG. 5 is a schematic view of the photoelectric control switch of the present invention in accordance with a second application embodiment.

As shown in FIG. 1, the photoelectric control switch comprises a control rod 2 which can traverse between an on-position and an off-position, an optical coupling sensor 4 being disposed on an extension line of one end of the control rod 2 and electrically connected with the control circuit board 30 (as shown in FIGS. 4-5) of the mouse pen, and an elastic element 5 used for resetting the control rod 2.

The control rod 2 comprises a first end 20 close to the optical coupling sensor 4, and a second end 22 far away from the optical coupling sensor 4. As shown in FIG. 1 in accordance with the embodiment, the first end of control rod 2 is equipped with a reflection cap 7 as a reflection element. The reflection cap 7 can be made from plastic, can be shaped about like a Chinese character "凸", and comprises a cap top 70, a cap edge 72, and a cap body 74 being connected between the cap top 70 and cap edge 72. An outer surface of the cap top 70 is equipped with a reflection layer 700. The reflection layer 700 can be obtained by directly coating the outer surface of the cap top 70 with reflecting ink or reflecting paint, or even adding silver powder into the plastic materials of manufacturing the reflection cap 7, so as to impart reflection effects to the outer surface of the cap top. The shell 1 correspondingly defines an orifice 10 for protruding the second end 22 of the control rod 2.

The optical coupling sensor 4 is disposed in the shell 1, is used for generating operation signals of mouse control and/or operation signals of pen-on and pen-off control when using handwriting input of the mouse device. The optical coupling sensor 4 comprises a light emitter 40 and a light receiver 42.

As shown in FIG. 1, the elastic element 5 is fitted over the cap body 74. For positioning the elastic element 5, the shell 1 forms a first limit block 12 corresponding to the first end 20 of the control rod 2. Both ends of the elastic element 5 respectively abut against the cap edge 72 and the first limit block 12. The elastic element 5 is mainly used to supply resilience force to the control rod 2, when a force is applied to drive the second end 22 of the control rod 2 moving towards the optical coupling sensor 4, the elastic element 5 namely generates elastic deformation to afford resilience force. Once the force applied to the second end 22 of the control rod 2 is removed, the control rod 2 will be restored to original position under the resilience force of the elastic element 5. The elastic element can be a coil spring, or elastic rubber sheath, and the like element made from other elastic materials. To prevent the control rod 2 popping out due to an over bounce under the resilience force of the elastic element 5, the shell 1 forms a second limit block 14 corresponding to the second end 22 of the control rod 2, the middle section of the control rod 2 forms a stop part 24, and the stop part 24 is engaged with the limit block 14 to limit the position of the control rod 2. An elastic washer 23 is fitted on the section of the control rod 2 between the stop part 24 and the reflection cap 7. The elastic washer 23 can be a rubber washer or the washer made from other elastic materials with certain elasticity. Considering control sensitivity, a compressible length of the elastic element 5 may be designed as 30~50 dmm, and a compressible length of the elastic washer 23 may be designed as 3 mm which is larger than that of the elastic element 5. Therefore, the elastic washer 23 can act buffering as far as possible to avoid damage to the optical coupling sensor 4.

The shell 1 can directly make use of a housing of the mouse device, and can also be designed as a shell independent of the mouse housing and specially for accommodating the control rod 2, optical coupling sensor 4 and the elastic element 5, and as shown in FIG. 1, the embodiment namely uses the latter independent shell. The advantages of such independent-shell design is that the photoelectric control switch can be fabricated and assembled as a standard element in advance, and then can be directly installed and used for manufacturing the mouse device, which improves product-standardization degree and production efficiency, and is beneficial to control product quality. While the shell 1 directly makes use of the mouse housing, the first limit block 12 and the second limit block 14 directly protrude from inner wall of the mouse housing, and the optical coupling sensor 4 is also directly mounted to the inner wall of the housing or other corresponding fixing object of the mouse device, such as control circuit board of the mouse device.

An operating principle of the photoelectric control switch of the present invention is that: when the control rod 2 is set on an on-position of its movement distance (in accordance with the embodiment as shown in FIG. 1, namely as the lowest end of its movement distance), light emitting from the light emitter 40 of the optical coupling sensor 4 is received by the light receiver 42 after being reflected by the reflection cap 7, and the optical coupling sensor 4 sends out a first control signal; while the control rod 2 is set on an off-position (in accordance with the embodiment as shown in FIG. 1, namely as the most top end of its movement distance), the light receiver 42 of the optical coupling sensor 4 cannot receive light emitting from the light emitter 40 and being reflected by the reflection cap 7, and then the optical coupling sensor 4 sends out a second control signal. The control circuit board of the mouse device will convert the first control signal and the second control signal to corresponding mouse operation signals, which implements traditional mouse operations such as left button, right button, middle button, and so on, and implements handwriting-input control while the mouse device in handwriting-input mode. For instance, at an initial position of the control rod 2 without application of force thereto, under the resilience force of the elastic element 5, the reflection cap 7 keeps far away from the optical coupling sensor 4 on the on-position, the optical coupling sensor 4 is switched on to send out the first control signal, herein, which corresponds to no mouse operation, or corresponds to pen-off signal of handwriting input in the handwriting-input mode; while application of force to the second end 22 of the control rod 2 makes control rod 2 and the reflection cap 7 thereon synchronously move towards the optical coupling sensor 4, the reflection cap 7 is driven to press the elastic element 5 and moves close to the optical coupling sensor 4 on the off-position, the optical coupling sensor 4 is switched off and correspondingly generates the second control signal, herein, which corresponds to output corresponding mouse operation signals, or corresponds to output pen-on control signal of handwriting-input control in handwriting-input mode; and while removing the force applied to the second end of the control rod 2, the reflection cap 7 resets the on-position being far away from the optical coupling sensor 4 again under the resilience force of elastic element 5, which switches on the optical coupling sensor 4 again, namely stops to output mouse operation signals, or outputs pen-off signal in handwriting-input mode.

In above embodiment, the optical coupling sensor 4 is a kind of normally closed switch, namely, when the control rod 2 is free of force, the optical coupling sensor 4 is set in an on-state; otherwise, it switches to off-state as a force being applied to the control rod 2. It is understood that the optical coupling sensor 4 can also be a kind of normally open switch, for implementing, it only needs to amend definitions of programmable controller of the existing mouse device according to on-state and off-state of the optical coupling sensor and convert to output corresponding operation signals.

Figure 2:
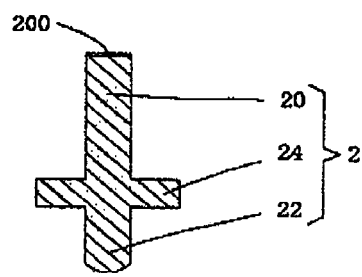
FIG. 2 is a schematic view of a control rod of the photoelectric control switch of the present invention in accordance with a second embodiment.

As shown in FIG. 2 in accordance with the second embodiment, an outer surface of the second end 22 of the control rod 2 is equipped with a reflection layer 200 as the reflection element to replace the reflection cap 7, which performs the same function of reflecting light emitting from the light emitter 40 of the optical coupling sensor 4. Herein, the elastic element 5 is directly worn on the control rod 2.

Figure 3:
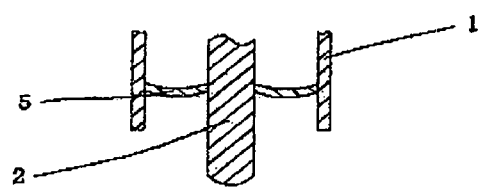
FIG. 3 is a schematic view of an elastic element of the photoelectric control switch of the present invention in accordance with a third embodiment.

As shown in FIG. 3 in accordance with the third embodiment, the elastic element 5 can also take the form of elastic sheet with a proper elasticity, of which one end is fixed relative to the control rod 2, and the other end is fixed relative to the shell 1. In the same way, when the control rod 2 moves towards the optical coupling sensor 4, the elastic element 5 will generate elastic bending so as to provide an elastic restoring force to the control rod 2 once the external force applied to the second end of the control rod 2 is removed.

The above photoelectric control switch can be applied to various mouse devices, when such photoelectric control switch described above is arranged in housing 8 of the mouse device. All kinds of traditional function control switch of mouse device, such as: left button, right button, middle button, and etc., can be performed by using the photoelectric control switch of the present invention. The photoelectric control switch of the present invention especially adapts to mouse device with handwriting-input function so as to conveniently perform handwriting-input control.

As shown in FIG. 4 in accordance with the first application embodiment, the housing 8 of the mouse device preferably takes the form of a relative new pen-shape, and comprises a penholder 80, a pen head 82 mounted in bottom end of the penholder 80, and a penpoint 83 inserted in bottom end of the pen head 82. The penpoint 83 comprises a stem part 830 and a pointed-cone part 832 at bottom end of the stem part 830 by an integrated molding process. The stem part 830 is inserted in the mouse housing 8 from an insert hole 820 in the bottom end of the mouse housing 8 and is connected with the second end 22 of the control rod 2, while the pointed-cone part 832 extends out of the housing 8 of the mouse device. An outer diameter or width of the pointed-cone part 832 near bottom end of the stem part 830 is larger than diameter of the insert hole 820, so as to prevent the whole penpoint 83 being inserted in the pen head 82 by a mighty breaking, and also to prevent that the penpoint 83 in use is over inserted to damage the optical coupling sensor 4 or the like components therein. In the embodiment as shown in FIG. 4, the position of the second limit block 14 is changed to be set on the pen head 82, and it is only necessary to make the stop part of the control rod 2 bigger than the insert hole 820, so limiting the position of the control rod 2 is performed. The penpoint 83 as a component exerts force to the second end 22 of control rod 2, when the mouse device is grasped and pressed downwards, the penpoint 83 moves inwards the housing 8 and provides a force to the second end 22 of control rod 2. The penpoint 83 of the pen-shaped mouse device is engaged with the photoelectric control switch, which can implement traditional operations of the mouse device, and can also be used for pen-on and pen-off control of handwriting input when being switched in handwriting-input mode.

As shown in FIG. 5 in accordance with the second application embodiment of the photoelectric control switch, the mouse device of the present invention uses a traditional mouse housing, and button 84 is disposed on the mouse housing 8, an inner end of button 84 abuts against the second end 22 of the control rod 2, and control to the photoelectric control switch is implemented by pressing button 84 to effort force to the second end of the control rod 2.

Figure 6:
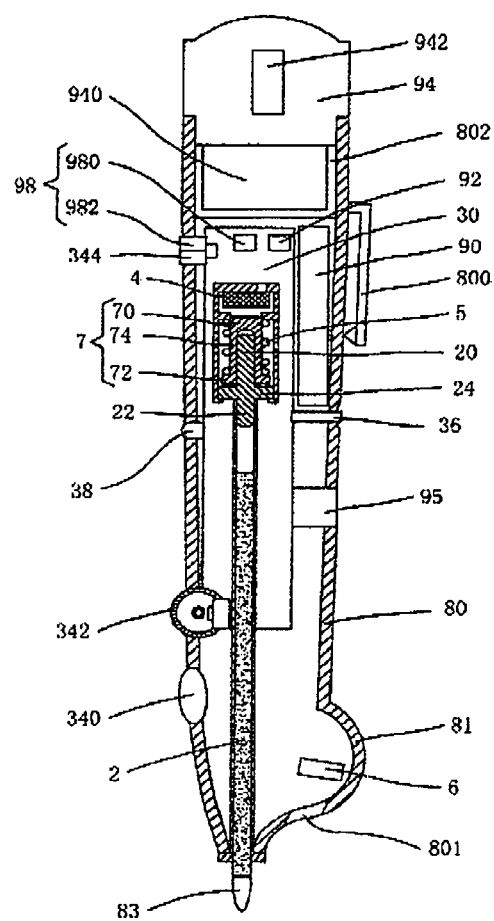
FIG. 6 is a schematic view of a mouse pen of the present invention in accordance with a first embodiment.

On the other hand, the present invention also provides a mouse pen, as shown in FIG. 6 in accordance with the first embodiment of the mouse pen, the mouse pen comprises the penholder 80, the penpoint 83 being inserted in the bottom end of the penholder 80, control circuit component set inside the penholder 80, optical component 6, and power source 90.

The penholder 80 is hollow for accommodating the control circuit component, optical component 6, and so on, and defines the insert hole in the bottom end thereof so as to penetrate the penpoint 83. At a top side of the penholder 80 is further set an elastic pen clip 800, a bottom side of the penholder 80 protrudes to form an embossment part 81 for receiving the optical component 6 therein, and a bottom surface of the embossment part 81 defines a light hole 801, and the optical component 6 is set aligned to the bottom end of the penpoint 83.

The control circuit component comprises a control circuit board 30 disposed inside the penholder 80, the photoelectric control switch being connected with the control circuit board 30 and engaged with a top end of the penpoint 83 so as to generate mouse control signals, button set disposed on sidewall of the penholder 80, power switch 36 and indicator 38. The button set comprises mouse right button 340, wheel button 342, wheel button, and cursor shift-speed button 344. Herein, the photoelectric control switch is described above, and the detailed description thereof will be omitted.

In this embodiment, the penpoint 83 is a ball pen core or ink pen core. Therefore, it is very convenient to replace, and can be used as ball pen or ink pen when not to use the mouse function. Of course, it is understood that solid or hollow plastic rod or metal rod can also be used as the penpoint 83.

For more convenient use, usually in the penholder 80 is set a wireless transmitter 92 used to transmit control signals of the mouse pen to a corresponding computer in a wireless manner. The penholder 80 at top end thereof has a receptacle part 802, a wireless receiver 94 is detachably disposed in the receptacle part 802, the wireless receiver 94 is connected with the receptacle part 802 by a threaded fit or snap fit, and the wireless receiver 94 has a USB connector 940. In use, the wireless receiver 94 is detached from the penholder to be directly inserted to the computer via the USB connector 940, so that the received wireless signal can be inputted to the computer to implement mouse control functions. Additionally, the wireless receiver 94 has a memory chip 942 set therein, the memory chip 942 cooperates with the USB connector 940 to form a memorizer, so, as the wireless receiver 94 is inserted to the computer to implement receiving and transmitting wireless signals, it can also be used as a U-disk for data read and write.

In the present invention, the mouse pen also has DPI-value setting module, the DPI value (full English spelling is "dots per inch", namely "pixel at each inch") can be accordingly set as 200, 400, 600, 800, four levels, or even more. In handwriting mode, the DPI value is preferably set as 200, relatively lower DPI value keeps the cursor moving relatively slower, so as to meet handwriting input.

The power source 90 is preferably rechargeable battery, and accordingly a USB port 95 is defined in the penholder 80 for charging up the power source 90.

Figure 7:
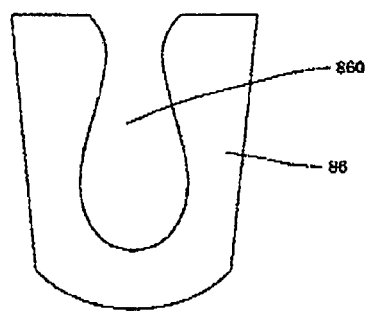
FIG. 7 is a schematic view of a pen cap for the mouse pen of the present invention.

As shown in FIG. 7, the mouse pen of the present invention further has a pen cap 86 for detachably covering the bottom end of the penholder 80. The pen cap 86 respectively sets groove 860 for correspondingly receiving the right button 340 being protruding from bottom side of the penholder 80, and the embossment part 81. If not to use the mouse pen, the bottom of penholder 80 can be covered for protection.

For further expand functions of the mouse pen, in the penholder of the portable mouse pen further comprises a laser-pointer module 98, the laser-pointer module 98 comprises a laser generator 980 inside the penholder 80 and a laser-pointer control button 982 at one side of the penholder 80.

Figure 8:
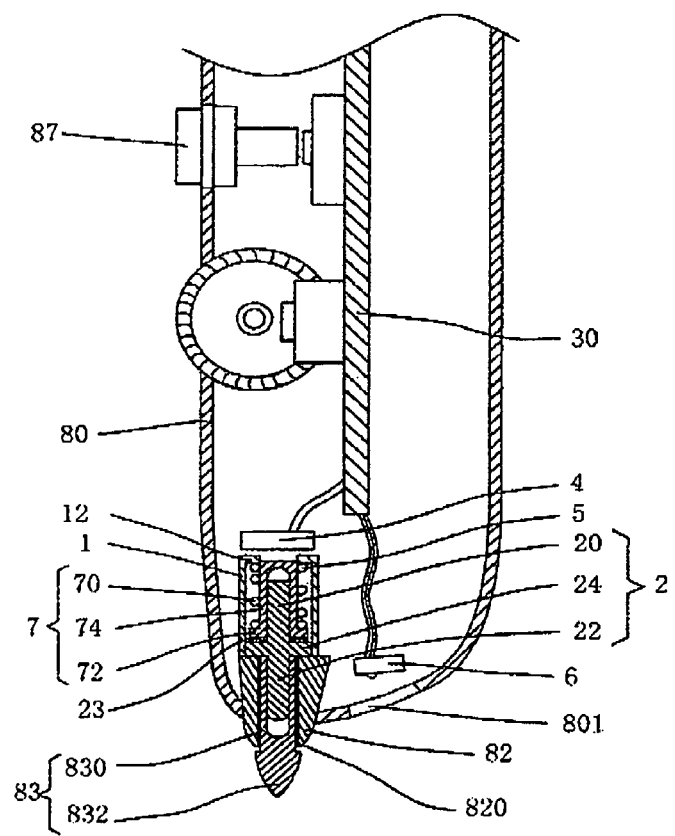
FIG. 8 is a schematic view of a mouse pen of the present invention in accordance with a second embodiment.

In the second embodiment of the mouse pen of the present invention as shown in FIG. 8, the mouse pen comprises the penholder 80, pen head 82 fixed in bottom end of the penholder 80, penpoint 83, circuit board 30 being mounted in the penholder 80 and the optical component 6 being connected with the circuit board 30.

The penholder 80 is hollow for assembling the circuit board 30 and the like. The bottom end of the penholder 80 defines the light hole 801. The photoelectric control switch is set in the penholder 80, which is engaged with the top end of the penpoint 83 so as to generate mouse control signals. Herein, the photoelectric control switch is described above, and the detailed description thereof will be omitted.

The pen head 82 is fixed in bottom end of the penholder 82, and defines the insert hole 820 in bottom end thereof The insert hole 820 is set aligned to the second end 22 of the control rod 2 of the photoelectric control switch inside the penholder 80. Width of the insert hole 820 is smaller than the outer diameter of the stop block 24 of the control rod 2, so that the stop block 24 can prevent the control rod 2 falling out from the insert hole 820.

The penpoint 83 is inserted in the insert hole 820, as shown in FIGS. 9-10, the penpoint 83 comprises the stem part 830 which is inserted in the insert hole 820 of the pen head 82 and the pointed-cone part 832 which is integrated with a bottom end of the stem part 830 and extends out of the pen head 82. The top end of the stem part 830 defines an abutting slot 834 axially extending. When the stem part 830 is inserted in the pen head 82 through the insert hole 820, the second end 22 of the control rod 2 in the penholder 80 is inserted in the abutting slot 834, namely both are inserted into each other, in such a way that the penpoint 83 is fixed to the control rod 2. An outer diameter of the pointed-cone part 832 near the stem part 830 (if pointed-cone part 832 is instead designed not as a cone, then herein referring as the width of the widest part thereof) is larger than a diameter of the insert hole 820, so as to prevent the whole penpoint 83 being inserted in the pen head 82 by a mighty breaking, and also to prevent that the penpoint 83 in use is over inserted and thus to damage the optical coupling sensor 4 and the like components therein. Additionally, for making the control rod 2 tightly connected with the stem part 830 of the penpoint 83 but conveniently pulling out the penpoint 83 for replacement, an interference fit is designed between the second end 22 of the control rod 2 and the abutting slot 834 of the stem part 830, and at least one profile groove 835 axially extending and communicated with the abutting slot 834 is further set along a top sidewall of the stem part 830. Therefore, when the second end 22 of the control rod 2 is inserted in the abutting slot 834, the sidewall of the abutting slot 834 is namely expanded, and due to the elastic restoring force itself, the sidewall of the abutting slot 834 will tightly grasp the second end 22 of the control rod 2.

The key optical component 6 is a transmit-receive integrative chip 60, as shown in FIG. 11. The transmit-receive integrative chip 60 has sealed therein with a laser-generating chip 601 and an image receiver 602. The laser-generating chip 601 and image receiver 602 are all set towards the light hole 801 of the penholder 80, and are set a proper angle therebetween, so that light emitting from the laser-generating chip 601 passes the light hole 801 and irradiates the tip of the penpoint 83, image generated from the tip sliding on the plane is received by the image receiver 602, so as to chase the movement trace of the mouse.

Since the optical component 6 use laser as light source, when the pen is taken up, the cursor displayed on the monitor of computer will still move on the monitor according to the movement of the mouse pen, which brings great inconvenience for use. Therefore, a cursor positioning switch 87 connected with the circuit board 30 is further set on the penholder 80. When the cursor positioning switch 87 is pressed, as mouse pen is taken up and moves, the cursor displayed on the monitor keeps motionless, and not move with the movement of the mouse pen.

The mouse pen can also be supplied with a pen seat for charging. The pen seat sets a socket, and the penholder 80 of mouse pen is inserted in the socket for charging. For prevent generating displacement when the penholder 80 being inserted in the pen seat for charging, contacts (not shown) of copper sheets for charging are difficultly positioned, which can affect charging performance, thus bottom end of the penholder 80 sets recess (not shown), and corresponding end in the socket of the pen seat accordingly sets protrusion which is tightly engaged with the recess, so that the penholder 80 is well positioned.

Figure 13:
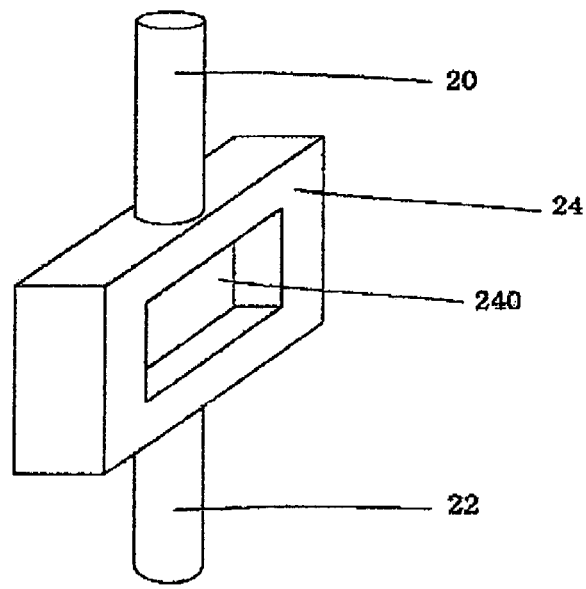
FIG. 13 is a schematic view of the control rod of the mouse pen of the present invention in accordance with the third embodiment.

As shown in FIGS. 12~13, the mouse pen of the present invention in the third embodiment, has such main differences from the second embodiment that: the stop block 24 at middle section of the control rod 2 defines a through opening 240 (as shown in FIG. 13) at center thereof, accordingly the penholder 80 in an inner wall thereof forms a first locking groove 805. While the transmit-receive integrative chip 60 penetrates the through opening 240 and has one end thereof fixed in the first locking groove 805, and the laser-generating chip 601 and image receiver 602 positioned at the other end the transmit-receive integrative chip 60 are all set towards the light hole 801 of the penholder 80. Since the transmit-receive integrative chip 60 is inserted in the through opening 240, and the through opening 24 sets reserved spaces to both top and bottom sides of the transmit-receive integrative chip 60, so that the fixed transmit-receive integrative chip 60 will not affect the control rod 2 moving up and down. Additionally, in a second embodiment, the shell 1 at bottom end thereof forms a locking edge 15, accordingly, the inner wall of the penholder 80 forms a second locking groove 807, and the shell 1 is fixed in the penholder 80 via the locking edge 15 being engaged with the second locking groove 807.

In this embodiment, the stop block 24 of the control rod 2 defines the through opening 240, and the transmit-receive integrative chip 60 has one end penetrating the through opening 240 of the stop block 24 and being mounted in the inner wall of the penholder 80, which can further reduce the size of the penholder 80 at the bottom end, and facilitate to grasp.

Figure 14:
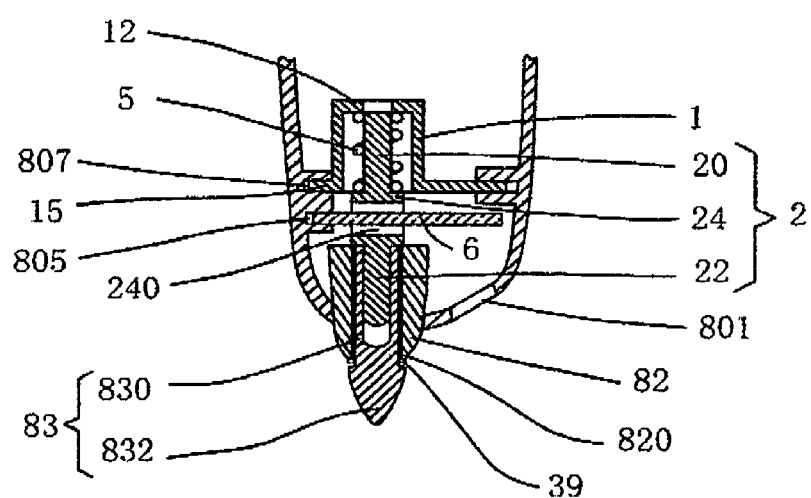
FIG. 14 is a schematic view of the penpoint installation of the mouse pen of the present invention in accordance with a fourth embodiment.

As shown in FIG. 14 in the fourth embodiment of the present invention, thereinto, the pen head 82 and control rod 2 is the same with the mouse pen in the third embodiment, this embodiment uses mechanical switch 39 to replace the optical coupling sensor 4 in both embodiments as described above, accordingly, the reflection cap 7 is not necessary yet. The mechanical switch 39 can be microswitch or thin-film switch, and is correspondingly set at bottom end of the pen head 82. When the penpoint 83 is pressed to move upwards, the mechanical switch 39 is pressed by top end of the pointed-cone part 832 of the penpoint 83, and thereby acts as the optical coupling sensor 4 in both embodiments as described above. While the penpoint 83 is not pressed, the control rod 2 resets under the elastic element 5.

What is claimed is:

1. A photoelectric control switch, being set to a mouse device, wherein the photoelectric control switch comprises a control rod which is disposed in a shell and can traverse between an on-position and an off-position, an optical coupling sensor disposed neared an extended end of the control rod and electrically connected with a control circuit board of the mouse device, and an elastic element which is used f(r resetting the control rod; the control rod comprises a first end which is close to the optical coupling sensor and is equipped with a reflection element and a second end which is far away from the optical coupling sensor and is used for driving the control rod to be close to the optical coupling sensor; the shell defines an orifice for protruding the second end; the optical coupling sensor comprises a light emitter and a light receiver, when the control rod is set on the on-position, light emitting from the light emitter can be received by the light receiver after being reflected by the reflection element, while the control rod is set on the off-position, the light receiver can not receive the light emitting from the light emitter and reflected by the reflection element;

wherein the reflection element is a reflection cap being worn on the first end of the control rod; the reflection cap comprises a cap top, cap edge, and cap body connected between the cap top and the cap edge; an outer surface of the cap top is equipped with a reflection layer; a first limit block fixed relative to the shell is disposed between the optical coupling sensor and the cap edge; the elastic element is fitted on the cap body with both ends thereof respectively abutting against the first limit block and the cap edge; the shell configures a second limit block corresponding to the second end; and the control rod at middle section thereof is equipped with a stop part which is engaged with the second limit block so as to limit a movement of the control rod.

2. The photoelectric control switch according to claim 1 wherein the elastic element is a coil spring, or elastic rubber, or elastic sheet; the elastic element has one end fixed relative to the control rod and the other end fixed relative to the shell.

3. A mouse pen comprising a penholder, a penpoint inserted in an bottom end of the penholder, a control circuit component disposed in the penholder, and an optical component; said control circuit component comprising a control circuit board disposed in the penholder, a photoelectric control switch connected with the control circuit board and engaged with a top end of the penpoint so as to generate mouse control signals, a button set and a power switch which are disposed at a side wall of the penholder; wherein said photoelectric control switch is the photoelectric control switch according to claim 1.

4. The mouse pen according to claim 3 wherein said optical component comprises a transmit-receive integrative chip, said transmit-receive integrative chip has sealed therein with a laser-generating chip and an image receiver, said bottom end of the penholder defines a light hole, said laser-generating chip and image receiver are all set towards the light hole, light emitting from the laser-generating chip passes the light hole and irradiates a tip of the penpoint, and images generated by the penpoint sliding on a plane are received by the image receiver.

5. The mouse pen according to claim 3 wherein said penpoint is a ball pen core, or an ink pen core, or a plastic rod, or a metal rod.

6. The mouse pen according to claim 4 wherein said mouse pen further comprises at least one of the following components:
   a cursor positioning switch being disposed on the penholder and connected with the control circuit board which is used for fixing a position of the cursor;
   a battery disposed in the penholder and a USB (universal serial bus) port which is defined on the penholder, is connected with the control circuit board, and is used for charging the battery; or
   a laser-pointer module, comprising a laser generator inside the penholder and a laser-pointer control button at one side of the penholder.

7. The mouse pen according to claim 3 wherein a wireless transmitter is fitted in the penholder which is used to transmit control signals of the mouse pen to a corresponding computer in a wireless manner, the penholder at a top end thereof has a receptacle part, a wireless receiver is detachably disposed in said receptacle part for receiving signals transmitted from the wireless transmitter, said wireless receiver is connected with said receptacle part by a threaded fit or snap fit, and the wireless receiver is further equipped with a USB (universal serial bus) connector for being inserted to the computer and a memory chip which cooperates with the USB connector to form a USB storage device.

8. The mouse pen according to claim 4 wherein the mouse pen comprises a DPI-value (dots per inch-value) setting module, which at least is set with a level of 200 DPI.

9. The mouse pen according to claim 3, wherein the elastic element is a coil spring, or elastic rubber, or elastic sheet; the elastic element has one end fixed relative to the control rod and the other end fixed relative to the shell.

10. A mouse pen comprising a penholder, a penpoint inserted in an bottom end of the penholder, a control circuit component disposed in the penholder, and an optical component; said control circuit component comprising a control circuit board disposed in the penholder, a photoelectric control switch connected with the control circuit board and engaged with a top end of the penpoint so as to generate mouse control signals, a button set and a power switch which are disposed at a side wall of the penholder; wherein said photoelectric control switch comprises a control rod which is disposed in a shell and can traverse between an on-position and an off-position, an optical coupling sensor disposed neared an extended end of the control rod and electrically connected with the control circuit, and an elastic element which is used for resetting the control rod; the control rod comprises a first end which is close to the optical coupling sensor and is equipped with a reflection element and a second end which is far away from the optical coupling sensor and is used for driving the control rod to be close to the optical coupling sensor; the shell defines an orifice for protruding the second end; the optical coupling sensor comprises a light emitter and a light receiver, when the control rod is set on the on-position, light emitting from the light emitter can be received by the light receiver after being reflected by the reflection element, while the control rod is set on the off-position, the light receiver can not receive the light emitting from the light emitter and reflected by the reflection element; wherein said optical component comprises a transmit-receive integrative chip, said transmit-receive integrative chip has sealed therein with a laser-generating chip and an image receiver, said bottom end of the penholder defines a light hole, said laser-generating chip and image receiver are all set towards the light hole, light emitting from the laser-generating chip passes the light hole and irradiates a tip of the penpoint, and images generated by the penpoint sliding on a plane are received by the image receiver.

11. The mouse pen according to claim 10, wherein said penpoint is a ball pen core, or an ink pen core, or a plastic rod, or a metal rod.

12. The mouse pen according to claim 10, wherein said mouse pen further comprises at least one of the following components:
   a cursor positioning switch being disposed on the penholder and connected with the control circuit board which is used for fixing a position of the cursor;
   a battery disposed in the penholder and a USB (universal serial bus) port which is defined on the penholder, is connected with the control circuit board, and is used for charging the battery; or
   a laser-pointer module, comprising a laser generator inside the penholder and a laser-pointer control button at one side of the penholder.

13. The mouse pen according to claim 10, wherein the mouse pen comprises a DPI-value (dots per inch-value) setting, which at least is set with a level of 200 DPI.

14. The mouse pen according to claim 10, wherein a wireless transmitter is fitted in the penholder which is used to transmit control signals of the mouse pen to a corresponding computer in a wireless manner, the penholder at a top end thereof has a receptacle part, a wireless receiver is detachably disposed in said receptacle part for receiving signals transmitted from the wireless transmitter, said wireless receiver is connected with said receptacle part by a threaded fit or snap fit, and the wireless receiver is further equipped with a USB (universal serial bus) connector for being inserted to the computer and a memory chip which cooperates with the USB connector to form a USB storage device.

15. The mouse pen according to claim 10, wherein the elastic element is a coil spring, or elastic rubber, or elastic sheet; the elastic element has one end fixed relative to the control rod and the other end fixed relative to the shell.

\* \* \* \* \*